(No Model.)

J. C. A. MORITZ.
PAPER CASING.

No. 535,258. Patented Mar. 5, 1895.

Witnesses:
G. H. Rea.
J. G. Meyers, Jr.

Inventor;
Johann C. A. Moritz,
By James L. Norris.
Atty.

UNITED STATES PATENT OFFICE.

JOHANN CARL ALBERT MORITZ, OF BERLIN, GERMANY.

PAPER CASING.

SPECIFICATION forming part of Letters Patent No. 535,258, dated March 5, 1895.

Application filed September 21, 1893. Serial No. 486,135. (No model.)

*To all whom it may concern:*

Be it known that I, JOHANN CARL ALBERT MORITZ, a subject of the King of Prussia, residing at Berlin, in the Kingdom of Prussia and German Empire, have invented certain new and useful Improvements in Paper Casings, of which the following is a full and complete specification.

This invention relates to casings or coverings of various shapes and dimensions, adapted, more particularly, to contain or inclose musical instruments, and has for its object to provide a device of this character made from sheets or layers of paper, or paste-board in a peculiar manner hereinafter to be described, and which shall be simple, durable, and comparatively inexpensive in its manufacture.

Hitherto, casings of the kind referred to have been made commonly of wood, in order to secure the necessary degree of strength, for resisting the pressure which such casings have to undergo and so to protect the instruments contained therein, the last named being often of considerable value. It is particularly necessary that violin cases should be strong as well as large. Consequently, when these are made of wood, the cost attaching to the instrument is considerably increased. In order to obviate all these disadvantages, casings whether large or small should be made of some different material. By this invention, they may be made in such a way as to prove sufficiently stiff and strong although made of paste board.

In order to enable others skilled in the art to make and construct my invention I will proceed to describe the same in detail, reference being had to the accompanying drawings, in which—

Figure 1:
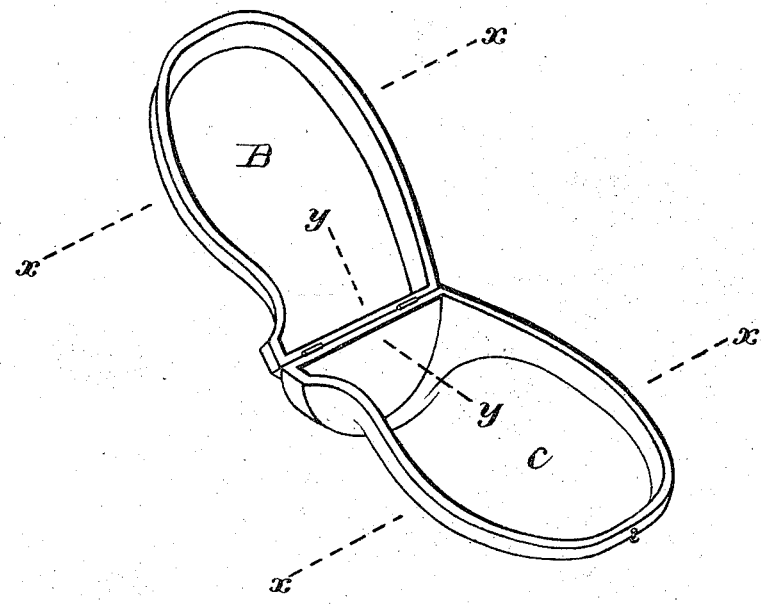
Figure 2:
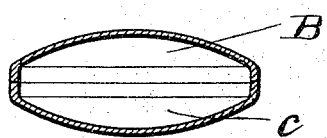
Figure 3:
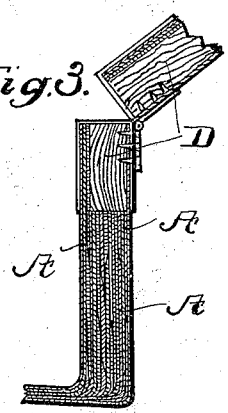
Figure 4:
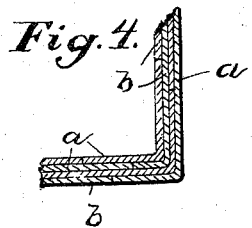

Figure 1 is a perspective view of a casing or covering constructed according to my invention, the upper lid being thrown back. Fig. 2, is a section of the casing when closed, taken through the lines $x$—$x$, Fig. 1. Fig. 3, is a sectional view of the hinged end of the box taken through the line $y$—$y$, of Fig. 1. Fig. 4 is a sectional view of a portion of a casing or covering, showing the different layers of material of which the same is constructed, breaking joints.

The manner of constructing a casing or covering according to my invention is as follows:—Paper, or paste board is prepared in strips or pieces of regular or irregular shape. These strips or pieces are introduced into a hollow mold which has the negative shape of the casing to be made. This casing may be either a whole casing or merely a part thereof. In the hollow mold several of these strips A, Fig. 3 are placed. The several paste board pieces of each layer are pasted with any suitable material and always in such a manner that the joints of one layer do not coincide with the joints of the next. The several layers thus produced are likewise pasted together. It is desirable that the pieces of paper, or paste board should be thin, because thin paste board fits more easily into the accidental and irregular forms of the mold. After being well dried, the mass represents one perfectly coherent piece of great durability and forms, in combination with the pasting substance, a material which may successfully compete with wood.

As casings of this kind are for the most part made of two equal or unequal pieces, B, C, it is necessary to join movably together the parts of the casing belonging to one instrument, after which the casing requires to be lodged. This is effected by the insertion of screws into the parts to be joined; but as the screws would not hold in the pasted stuff, small wooden rods or lists D, Fig. 3, must be inserted, the paste board substance serving to keep these rods in their respective places. After one or two layers have been pasted together inside the hollow mold, the rods are put in their respective places; and as the pasting on of more layers is proceeded with, the wooden rods belonging thereto are likewise pressed and pasted on. The rods are thus kept in their places by all the subsequent layers of paper, or paste board.

I claim—

A casing composed of strips of paper or paste-board arranged in successive layers breaking joints and pasted together, and screw receiving wooden rods or pieces incorporated in the walls of the casing and held in place by the inner and outer layers of said strips, substantially as shown and described.

In witness whereof I have hereunto set my hand in presence of two witnesses.

JOHANN CARL ALBERT MORITZ.

Witnesses:
 PAUL FISCHER,
 HANS BAUERLEIN.